DIAZO REPRODUCING MACHINE

Original Filed Dec. 2, 1964 Sheet 1 of 5

Inventors:
Frederick G. Wilde
Leslie Gordon Booth
By: Sol L. Goldstein
Atty

DIAZO REPRODUCING MACHINE

Original Filed Dec. 2, 1964

Inventors:
Frederick G. Wilde
Leslie Gordon Booth
By: Sol L. Goldstein
Atty.

DIAZO REPRODUCING MACHINE

Original Filed Dec. 2, 1964

Inventors:
Frederick G. Wilde
Leslie Gordon Booth
By: Sol L. Goldstein
Atty

DIAZO REPRODUCING MACHINE

Original Filed Dec. 2, 1964

Inventors
Frederick G. Wilde
Leslie Gordon Booth
By Sol L. Goldstein Atty

DIAZO REPRODUCING MACHINE
Original Filed Dec. 2, 1964
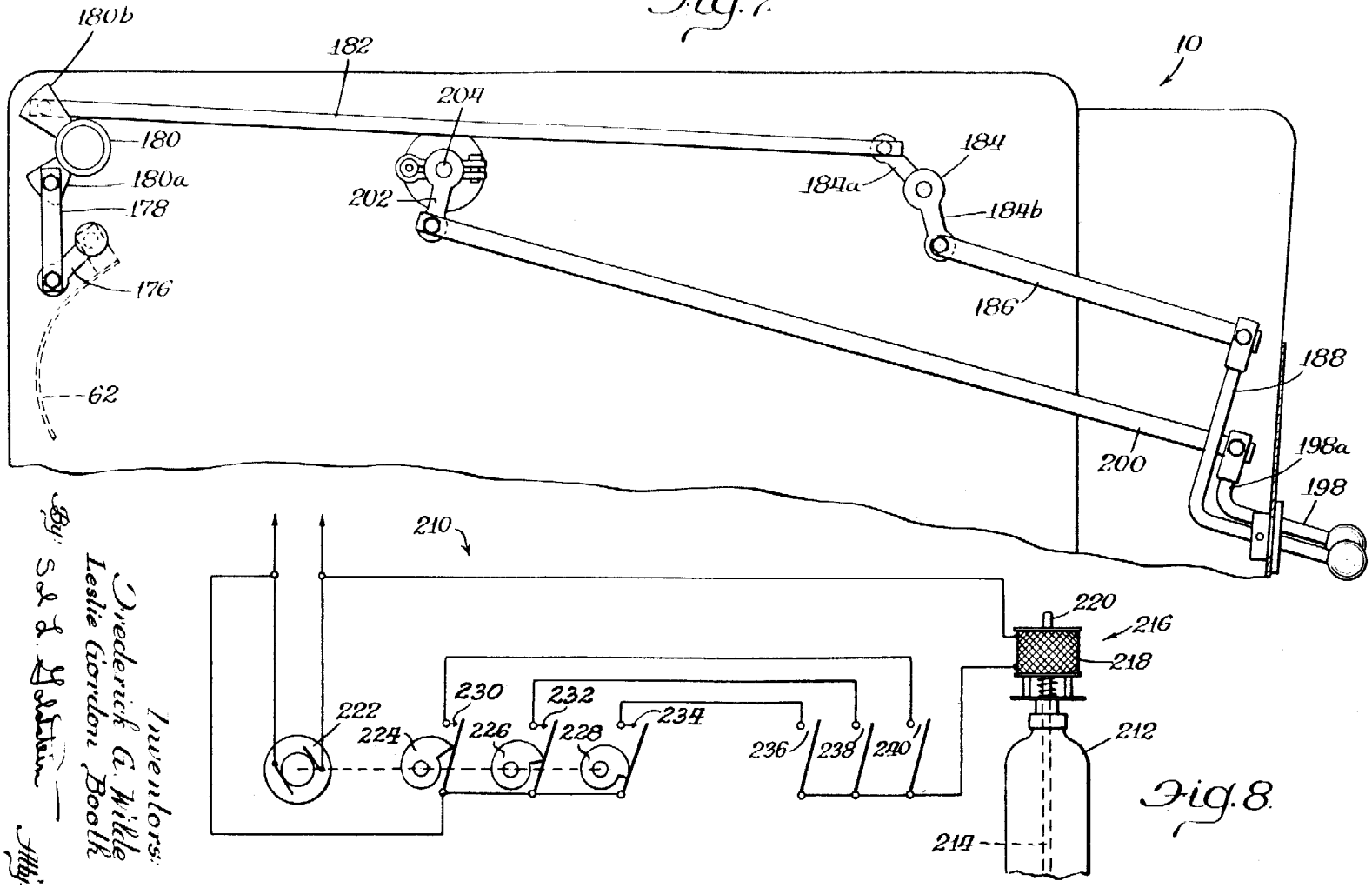
Inventors:
Frederick G. Wilde
Leslie Gordon Booth
By: Sol L. Goldstein
Atty.

United States Patent Office

Re. 26,525
Reissued Feb. 11, 1969

26,525
DIAZO REPRODUCING MACHINE

Frederick G. Wilde, Mount Prospect, Ill., and Leslie Gordon Booth, Rochester, N.Y., assignors to Addressograph-Multigraph Corporation, Charles Bruning Division, Mount Prospect, Ill., a corporation of Delaware Original No. 3,362,314, dated Jan. 9, 1968, Ser. No. 415,540, Dec. 2, 1964. Application for reissue Jan. 10, 1968, Ser. No. 708,468
U.S. Cl. 95—94 9 Claims
Int. Cl. G03d *3/00, 3/12*

Matter enclosed in heavy brackets [ ] appears in the original patent but forms no part of this reissue specification; matter printed in italics indicates the additions made by reissue.

ABSTRACT OF THE DISCLOSURE

An ammonia-type diazo copying machine in which the subject matter to be copied and the sensitized sheets are transported by a system of conveyor belts and nipping rollers. Provision is made to have the finished copy sheet exit from either the front or rear of the machine, selection being made by manually controlling a gating mechanism located along the path of the conveyor belts. Another gating device permits delivery of the copy at the front of one of two stations depending on the length of the copy. A tray, adjustable to infinite number of positions, is located at the front face of the machine to catch different size tracings, and disc members mounted on a common shaft serve to roll up tracings delivered into the tray. A pump, operated in response to preset timing cams, pumps developing material into the developing chamber at a rate which is independent of the speed of the conveyor belts and drive rollers.

This invention relate to a copying machine and, more particularly, to a new and improved copying machine using diazotype materials.

Copying machines using diazotype materials probably provide the most efficient and economical type of equipment for making the copies of original material, commonly tracings, of widely varying sizes. The original material that can be used with these machines varies from rather small discrete sheets to tracings having lengths in excess of ten feet. To realize all of the advantages of the diazotype reproducing or copying process, it is desirable to be able to produce copies of original material of all of the various sizes encountered with a single machine. However, many of the machines now available are not suitable or at least do not expeditiously handle copy and original material of widely varying sizes because of the difficulty of providing apparatus capable of transporting and collecting or receiving sheet and web material of such widely varying sizes. Further, many machines do not include easily controlled means for selecting and maintaining different rates of supplying the treating or developing agent, usually ammonia, to the machine.

Accordingly, one object of the present invention is to provide a new and improved copying machine.

Another object is to provide a new and improved copying or reproducing machine using diazotype materials.

Another object is to provide a copying machine including new and improved web and sheet conveying and separating means.

Another object is to provide a copying machine including means for selectively discharging sheet and web material of different sizes and for receiving this material at the end of the copying operation.

A further object is to provide a copying machine including new and improved means for supplying metered quantities of a treating agent, such as ammonia.

Another object is to provide a copying machine including new and improved vacuum controlled sheet and web feeding and separating means.

A further object is to provide a copying machine in which the original copying material is selectively discharged in different manners in dependence on the size thereof.

Another object is to provide a copying machine including means for selectively discharging sheet and web material at different locations and in different manners adapted to the size of the material.

A further object is to provide a copying machine including electrically operated pumping means for supplying a treating agent to the machine and means for selectively varying the rate at which the treating agent is supplied by selecting different numbers of operating signals in repetitive time cycles.

In accordance with these and many other objects, an embodiment of the present invention comprises a copying or reproducing machine using diazotype materials having a pair of opposed flexible belt conveying means for transporting an original to be copied, such as a tracing, and a discrete sheet or elongated web of copy material into the machine in a superimposed relation. The conveying means transports the superimposed tracing and copy material around a transparent drum containing a light source to expose the copy sheet, and the tracing is thereafter separated by a novel separating assembly including a vacuum applying structure having apertured projecting portions or ridges disposed between the belts in the flexible belt conveying means to improve the degree of contact with which the tracing or original copy material is held in engagement with the belts as it is separated from the exposed copy sheet.

The conveying and separating assembly discharges the leading edge of the tracing into a tracing receiver assembly comprising a receiver tray adjustably mounted in a plurality of different positions relative to the separating assembly. In one setting of the assembly, the receiver is disposed below and extending forwardly of the separating assembly to receive the original material, such as discrete sheets, as it is discharged from the machine through a discharge opening. In another setting, the tracing receiver is positioned forwardly and below the discharge opening from the separator assembly to expose an additional flexible material drive or feeding means which contacts the tracing and which is used with original material, such as greatly elongated tracings, to assist rolling the elongated tracing into a roll disposed in the receiver. The reeciver can also be mounted in an intermediate position in which it is useful for guiding the leading edge of an elongated web back into the inlet of the machine, for receiving discrete sheets of original material that are somewhat stiff, and for inverting a tracing.

The exposed copy material is retained in engagement with the conveying means by an additional vacuum unit at the point at which the tracing is separated. This web or sheet of exposed copy material is then transported through a developing chamber wherein the diazotype copy sheet is developed by contact with gaseous ammonia in the presence of water vapor. The proper atmosphere of ammonia gas and water vapor may be provided by directly heating in the chamber a supply of concentrate solution of ammonium hydroxide or by introducing anhydrous ammonia gas and heating a supply of water within the chamber.

Heretofore the rate of feeding the treating solution was dependent on the drive speed of the apparatus which governs the amount of light exposure given a particular original. Accordingly, large amounts of fluid would be pumped for copies receiving fast exposure and a longer light exposure would decrease the amount of ammonia without taking into account the number of copies being made. Because of the different demands on the apparatus as to the image area and number of copies to be reproduced, the developer or treating unit is supplied with the concentrated solution of ammonium hydroxide by means of an electrically controlled pump in preset measured quantities to meet said demands completely independently of the speed of the machine.

To provide means for operating the pumping means to supply different quantities of the treating agent, a plurality of electrical switches are provided which are repetitively closed in a time spaced sequence within a repetitive or recurring time frame or cycle by cam means driven by a continuously rotating electric motor. Different numbers of these cam operated switches are connected to the electrically operated pumping means by a control unit including a plurality of individual, manually operable switches so that the pumping means receives a selected number of operating signals or pulses during each time frame or cycle. Since a given quantity of the treating agent is supplied to the treating chamber or developer unit by each actuation of the pump, the selective application of different numbers of discrete pulses in the repetitive time cycle determines the quantity of treating agent supplied to the chamber in a given time interval. By this means, the copying machine is supplied with only the quantity of treating agent required by the type of copying operation being performed, and waste of the ammonia is avoided.

The developed copy sheet or web at the outlet of the treating chamber is advanced to a position adjacent a discharge opening in the back wall of the housing for the copying machine. In some applications in which long lengths of copy material are being exposed and developed, it is desirable to discharge the developed copy sheet at the rear of the machine. When this type of operation is desired, a manual control unit is adjusted to a position in which a gate adjacent the opening in the back wall of the unit is operated to an open condition, and the conveying means discharges the developed copy sheet through the rear discharge opening. Alternatively, if the copy sheet is to be delivered at the front of the machine, the control unit is adjusted to a setting in which the rear gate is closed. In this setting, the leading edge of the developed copy sheet or web is transported from a position adjacent the rear of the machine toward a part of the front of the machine in which a front discharge opening is provided.

At a position along the path of the travel of the conveying means located between the front and back of the machine, an additional control gate is provided. In one setting used when relatively long lengths or webs of copy material are developed, the gate is adjusted to a position in which the leading edge of the copy material is separated from the conveying means at a position interposed between the front and back walls of the housing and is propelled forwardly over guide surfaces including the gate to be received in a copy receiver positioned adjacent the front discharge opening. The copy sheet is fed into this position by the initial conveying means. If the control means is adjusted to position the gate in its alternate or second position, the leading edge of the copy material is directed downwardly to a second conveying means, and this second conveying means ejects or discharges the developed copy sheet into the copy receiver. This alternate setting is generally used when the copy material is of relatively short length and could not be completely ejected by the first or initial conveying means because the trailing edge of the copy sheet would be moved out of engagement with the conveying means prior to the time at which the leading edge is discharged through the front discharge means or received in the copy or print receiver.

Many other objects and advantages of the present invention will become apparent from considering the following detailed description in conjunction with the drawings in which:

FIG. 7 is a fragmentary elevational view illustrating the controls for the assembly shown in FIG. 6; and FIG. 8 is a schematic diagram of an arrangement for controlling the supply of treating agent to the copying machine.

Figure 1:
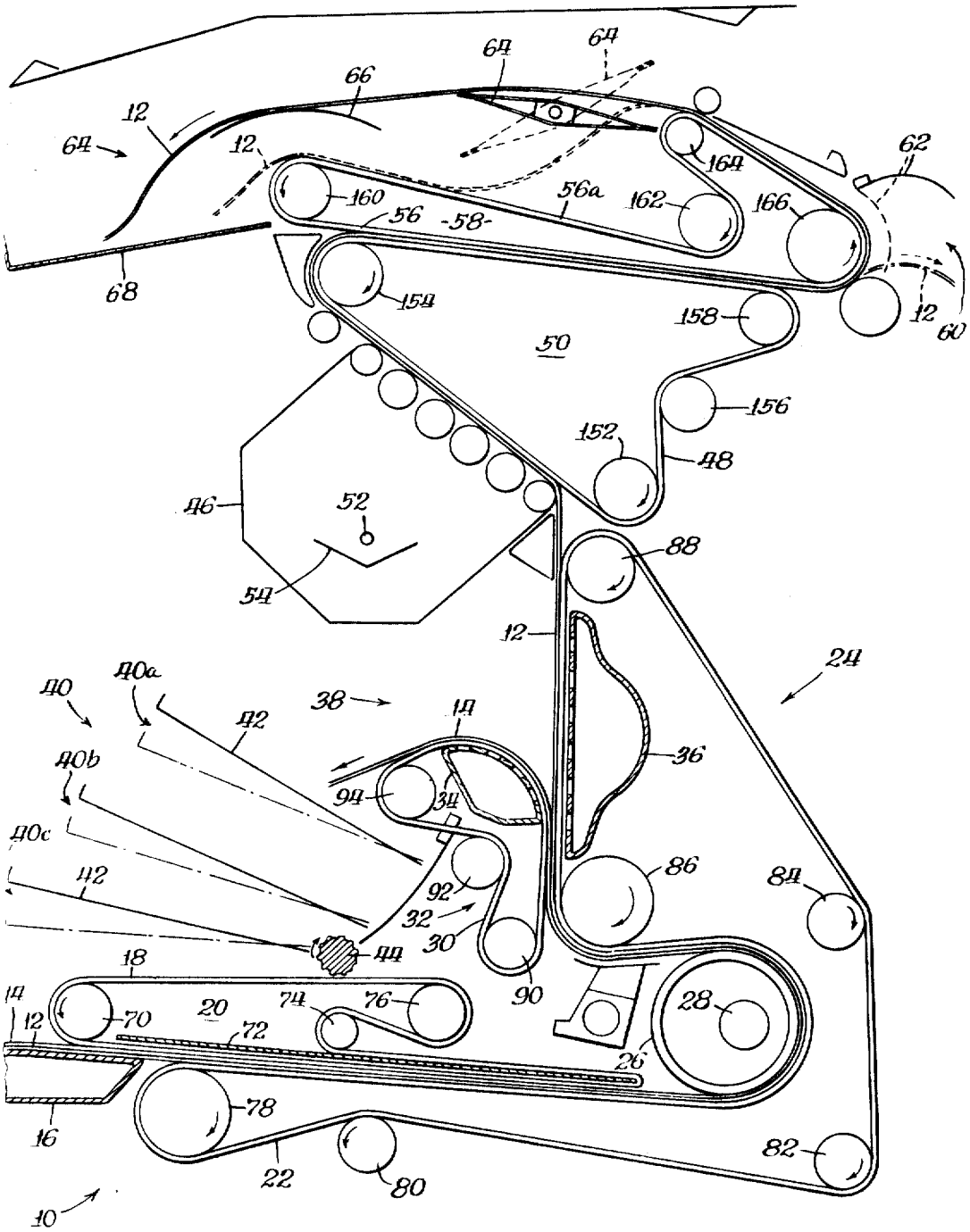
FIG. 1 is a schematic view of a copying apparatus embodying the present invention.
Figure 2:
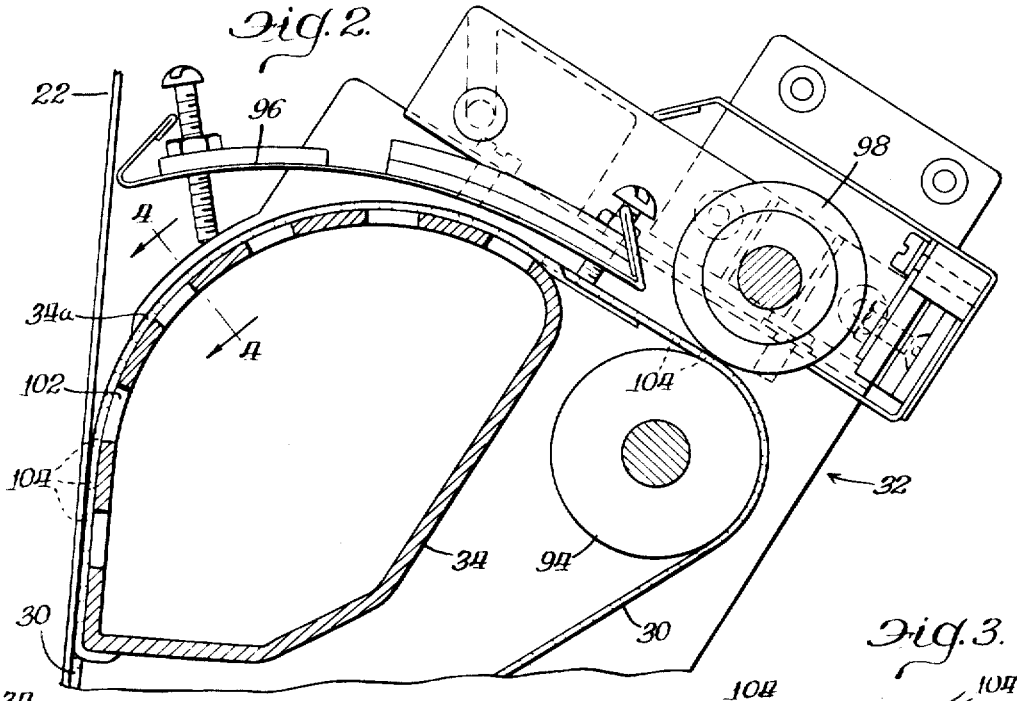
FIG. 2 is an enlarged sectional view of a vacuum separator for separating the original material or tracing and for discharging the tracing from the copying machine.
Figure 3:
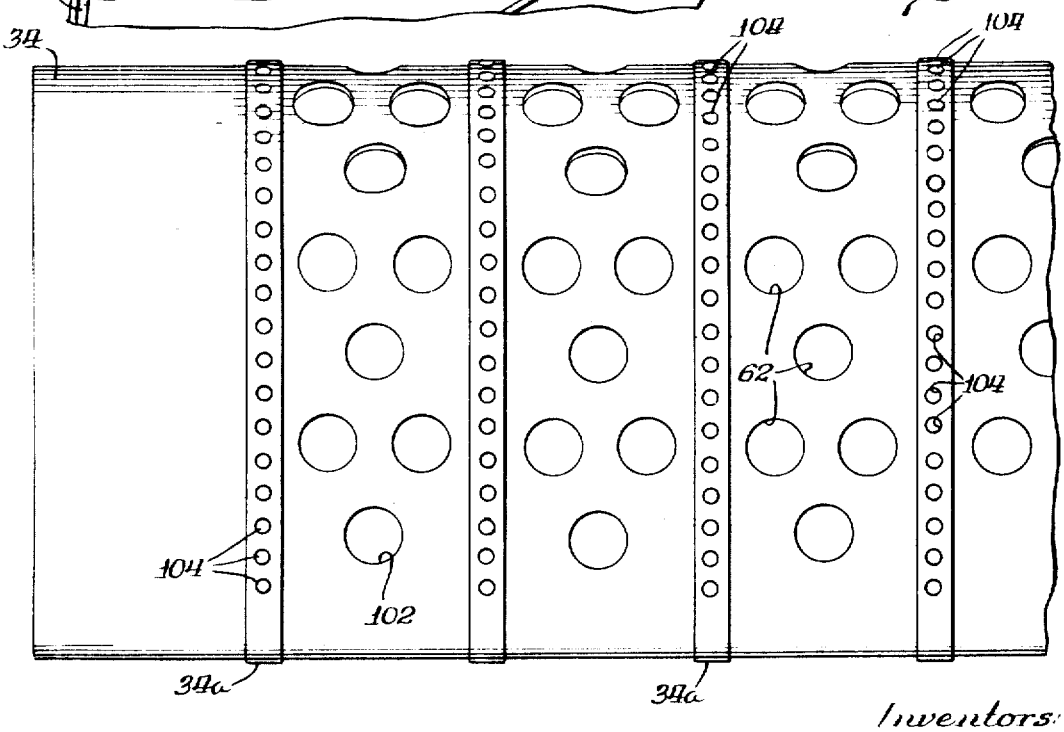
FIG. 3 is an enlarged fragmentary plan view of a portion of a vacuum tank or chamber included in the separating assembly shown in FIG. 2.
Figure 4:
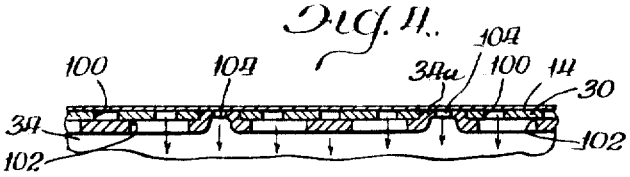
FIG. 4 is a fragmentary sectional view taken along line 4—4 in FIG. 2.

Referring now more specifically to FIG. 1 of the drawings, therein is illustrated a copying machine 10 which embodies the present invention and which is adapted to produce copies on diazotype copying sheets or webs 12 of original or graphic material from a flexible original or tracing 14. The sheets or webs of flexible material 12 and 14 are assembled in a superimposed relation with the tracing 14 overlying the copy material 12 on a feed table 16, and the assembled sheets are then inserted into the machine 10 to be engaged by a plurality of spaced flexible belts 18 in an upper inlet conveying assembly 20. The assembly 20 feeds the sheets 12 and 14 to a position in which they are disposed between the belts 18 and a plurality of flexible conveying belts 22 in a conveying assembly indicated generally as 24. The conveying assembly 24 then transports the superimposed sheets 12 and 14 around a transparent drum 26 containing a light source 28 so that the copy material 12 is exposed in accordance with the material on the original or tracing 14.

The exposed copy sheet or web 12 and the tracing 14 are then transported to a position in which a plurality of apertured flexible conveying belts 30 in a tracing separating assembly 32 engages the outer surface of the tracing 14. The assembly 32 includes a vacuum or suction chamber or tank 34 of a novel construction which retains the tracing 14 in engagement with the belts 30 to separate this tracing from the belts 22 of the conveying assembly 24, the exposed copy sheet 12 being retained in engagement with the belts 22 by another vacuum or suction tank 36. The separating assembly 32 discharges the leading edge of the tracing 14 through a tracing discharge opening indicated generally as 38 to be received in a new and improved tracing receiver assembly indicated generally as 40.

The assembly 40 includes a tracing receiving tray 42 that is adapted to be detachably and pivotally mounted on the supporting structure for the machine 10 in three spaced positions shown as 40a–40c in FIG. 1. The positions 40a and 40b are generally used when the tracing 14 comprises a relatively short sheet of original material. In the position 40a, successive tracings 14 are stacked in sequence on the tray 42. In the position 40b in which the tray 42 is disposed further below the discharge from the separator assembly 32, the leading edge of the sheet of tracing 14 tends to move toward the right-hand end of the tray so that the trailing edge flips over and the sheet 14 occupies an oppositely facing position from that which it would occupy in the tray 42 in position 40a. The orientation of the sheet 14 in the tray 42 in position 40b is such that it can be directly reinserted into the machine to produce an additional copy, as contrasted with its position in the tray 42 in position 40a in which it must be reversed or inverted before being reinserted. The location of the tray 42 in position 40b is also useful with tracings 14 that are somewhat stiff. In position 40c, the tray 42 is disposed forwardly and somewhat below the upper periphery of a clockwise rotating drive or feed means 44. The assembly 40 is adjusted to the position shown as 40c when elongated webs or large sheets are to be used. In this position, the leading edge of the tracing 14 strikes the tray 40 and, having a degree of forward or face curl, moves toward the rotating feed means 44. This feed means tends to direct the leading edge of the tracing 14 upwardly so that the tracing is rolled into a roll disposed within the tray 42.

The exposed copy sheet 12 from which the tracing 14 has been separated by the assembly 32 travels upwardly held in contact with the belts 22 of the conveying assembly 24 by the vacuum tank 36. The leading edge of the exposed copy sheet 12 passes between the structure of a treating chamber 46 and a plurality of flexible belts 48 forming a part of a conveying assembly indicated generally as 50. The treating chamber 46 includes a supply pipe or line 52 connected to a supply of liquid ammonium hydroxide by an electrically operated pumping means, the supply line 52 being disposed above a somewhat V-shaped trough 54 in which the liquid ammonium hydroxide is discharged. Because of the different quantities and speeds at which the copy material 12 is moved through the treating or developing chamber 46, it is necessary to supply different quantities of ammonia to the chamber. The machine 10 includes a novel control circuit shown in FIG. 8 of the drawings for adjusting the quantities of ammonia supplied to the inlet 52, which will be discussed in detail hereinafter.

As the leading edge of the developed copy sheet 12 leaves the developing chamber 46, it is advanced by the conveying assembly 50 to a position interposed between the belts 48 and a plurality of belts 56 forming a part of a conveying assembly 58. The assemblies 50 and 58 advance the copy sheet 12 toward the rear of the machine to a position adjacent a rear discharge opening indicated generally as 60. A gate element 62, when operated to the position shown in solid line in FIG. 1, opens the rear discharge opening 60 so that the leading edge of the developed copy sheet 12 passes outwardly from the back of the machine to be stacked or rolled. This discharge through the back of the machine 10 is commonly used with large size sheets 12. If the gate 62 is operated to the position shown in dashed line in FIG. 1, the leading edge of the copy sheet 12 is advanced by the conveying assembly 58 to a position located between the back discharge opening 60 and a front discharge opening indicated generally as 64 and at which a second gate means *64* [66] is disposed. If the controls for the machine 10 are adjusted so that the gate means 64 is in the position shown in solid line, the conveying assembly 58 advances the leading edge of the copy sheet 12 over the upper surface of the gate means 64 and an additional guide and supporting element 66 to be discharged into a print or copy receiver tray 68 under the driving force provided by the portion of the conveying assembly 58 disposed to the right of the gate element 64. The gate means 64 is adjusted to the position shown in solid line when the copy sheets 12 are large enough in size to be advanced so that the leading edge passes through the opening 64 and reaches the print tray 68 before the trailing edge leaves the conveyor. Alternatively, if the copy sheets 12 are of a smaller size, the controls for the machine 10 are adjusted to move the gate means 64 to the position shown in dashed outline. In this position, the leading edge of the copy sheet 12 impinges against the gate means 64 and is deflected down to engage portions 56a of the belts 56 in the assembly 58 which, in effect, provide a second conveying means. The portions 56a of the belts 56 then transport the copy sheet 12 to the print tray 68. The gate means 64 is adjusted to the setting shown in dashed outline when the copy sheet 12 is too short to be discharged through the opening 64 by the portion of the conveying assembly 58 disposed to the right of the gate means 64.

Referring now more specifically to the conveying means 20, this conveying means comprises a plurality of spaced flexible belts 18 which pass around a driven roller 70, a generally flat guide plate 72, and two idler or tensioning rollers 74 and 76. The conveying assembly 24 includes a driven roller or pulley 78 and a plurality of idler or tensioning rollers or pulleys 80, 82, 84, 86, and 88. The flexible belts 22 are maintained in spaced parallel positions and serve to advance the superimposed copy sheet 12 and tracing 14 past the exposing station provided by the drum 26 and the light source 28 to a position adjacent the separating assembly 32. Thereafter, the belts 22, in cooperation with the vacuum or suction tank 36, feed the exposed copy sheet 12 to the developing station or chamber 46.

The separating assembly 32 (FIGS. 1–4) includes the plurality of flexible belts 30 which are maintained in spaced positions on a drive pulley 90 and a pair of idler or tensioning pulleys 92 and 94. Movement of the tracing 14 around the tank 34 in contact with the flexible belts 30 is aided by a guide structure 96 mounted in an adjustable position on the supporting frame for the machine 10, and this tracing is pressed against the belts 30 opposite the pulley or roller 94 by a pressure roller 98 mounted in an adjustable position on the supporting structure for the machine 10.

To maintain the inner surface of the tracing 14 in contact with the belts 30 during the interval in which the tracing 14 is separated from the copy sheet 12, the belts 30 are provided with a plurality of spaced apertures 100 which place portions of the under surface of the tracing 14 in communication with the interior of the vacuum tank 34 through a plurality of openings or apertures 102 in the arcuate surface of the tank 34. This surface of the tank 34 is also provided with a plurality of raised portions or ridges 34a having spaced apertures 104 formed therein. The vacuum applied through the openings 100, 102, and 104 in the tank 34 and the belts 30 creates a pressure differential across the sheet 14 and tends to hold this sheet in contact with the moving belts 30 and to separate it from the copy sheet 12. In the usual arrangement, the apertured surface of the tank or chamber 34 is smooth and there are air spaces between adjacent spaced belts which tend to reduce the efficiency of the vacuum to hold the tracing 14 in contact with the moving belts 30. This reduces the efficiency of the separation of the tracing 14 from the copy sheet 12. In accordance with the present invention, the raised portions or ridges 34a are provided which aid in maintaining the positive spacing of the adjacent belts 30. Further, by the provisions of the openings 104 in the raised portions 34a, the interior of the vacuum tank 34 is placed in direct communication with the adjacent under surface of the tracing 14 in those areas in which the tracing is not engaged by the belts 30. This prevents the loss of vacuum normally occasioned by the open spaces between the adjacent belts and substantially enhances or increases the pressure differential across the tracing 14 with the accompanying increase in the effectiveness of the separator assembly 32.

The tracing receiving assembly 40 (FIG. 5) includes the tray construction 42 which comprises a generally rectangular table or tray 110 having a pair of brackets 112 mounted at its forward end. The brackets 112 carry means for adjustably and frictionally supporting a wire grid construction 114 having an upstanding forward edge 114a. The grid 114 can be adjusted to different positions relative to the table 110 to provide a tracing receiving tray of adjustable length.

To provide means for pivotally mounting a forward or intermediate portion of the tray 42 on a frame element 116 of the housing for the machine 10, two adjustable link assemblies 118 are provided connected to opposite side edges of the table 42. The telescoping or extensible linkage 118 includes a pair of rods 120 and 122. The upper end of the rod 120 is pivotally connected by a pin 124 to the supporting frame element 116, and the lower end of the rod 122 is pivotally connected by a pin 128 to a bracket 126 carried on the table 110. The inner ends of the rods 120 and 122 are frictionally clamped between a pair of plates 130 which are secured together by a pair of machine screws or bolts 132. By adjusting the positions of the rods 120 and 122 relative to each other, the forward portion of the tray 42 can be pivotally supported at different angular positions relative to the discharge of the separator assembly 32.

To provide means for pivotally mounting the rear end of the tray 42 at positions disposed generally below the separator assembly 32, one long or a pair of trunnions or pivot pins 134 are secured to the lower surface of the rear edge of the table 110. Two supporting plates 136 are mounted on the opposite walls or frame elements 116 and are provided with three spaced notches or slots 138, 140, and 142. A somewhat U-shaped plate or element 144 is secured in a spaced position to the edge of the plate 136 to define a raceway or track 146 in which the pins or trunnions 134 can be moved to permit these pivot pins to be pivotally mounted in any of the pairs of slots 138, 140, and 142.

When the machine 10 is to be used to produce copies of small size tracings 14 or a series of such tracings, the assembly 40 is adjusted to the position 40a in which the pivot pins or trunnions 134 are received in the slots 138 and the linkage 118 is adjusted so that the tray 42 occupies a substantially horizontal position. The wire grid 114 is adjusted in accordance with the lengths of the tracings 14. When a tracing 14 is discharged by the separator assembly 32, the leading edge thereof engages the table 110 and slides along the table toward the front edge 114a of the wire grid so that the trailing edge of the tracing 14 drops from the belts 30 onto a rearwardly disposed portion of the table 110. In this position, the face of the tracing 14 that was disposed adjacent the underlying copy sheet 12 during the feeding operation is faced upwardly so that the tracing 14 or the stack of tracings 14 requires inversion before another feeding operation.

When the machine 10 is to be used with small size tracings 14 which are to be repetitively fed into the machine 10, it is desirable to have the tracing discharged from the machine 10 in a position in which it can be immediately reinserted into the machine in a superimposed position with the copy sheet 12 without requiring inversion. When this type of operation is desired, the assembly 40 is adjusted to its position 40b in which the pivot pins 134 are pivotally received within the slots 140. The wire grid 144 is adjusted to a suitable length commensurate with the size of the tracing 14, and the linkage 118 is adjusted so that the forward end of the tracing receiving tray 42 is tipped upwardly in the manner shown in solid line in FIG. 5. When the tracing 14 is discharged from the separator assembly 32, the leading edge thereof tends to drop downwardly to engage a somewhat rearwardly disposed portion of the table 110. Thus, when the trailing edge of the tracing 14 is discharged by the assembly 32, the tracing 14 tends to pivot about its leading edge or to flip over. In this condition, the surface of the tracing 14 that is to be disposed adjacent the copy sheet 12 during the feeding operation is facing downwardly, and the tracing 14 does not require inversion before being subsequently inserted into the machine 10 to produce the next copy. The assembly 40 is also used in the position 40b shown in FIG. 5 in solid line when the tracing 14 is fairly stiff and flat, i.e., a polyester base. When the assembly 40 is used with this type of tracing, the inclination of the tray 42 is adjusted so that the leading edge of the tracing slides up the tray and the trailing edge drops on a more rearward portion of the table 110 on ejection from the separator assembly 32. This inclination of the tray 42 provides better visibility of the work area on the table 16.

Figure 5:
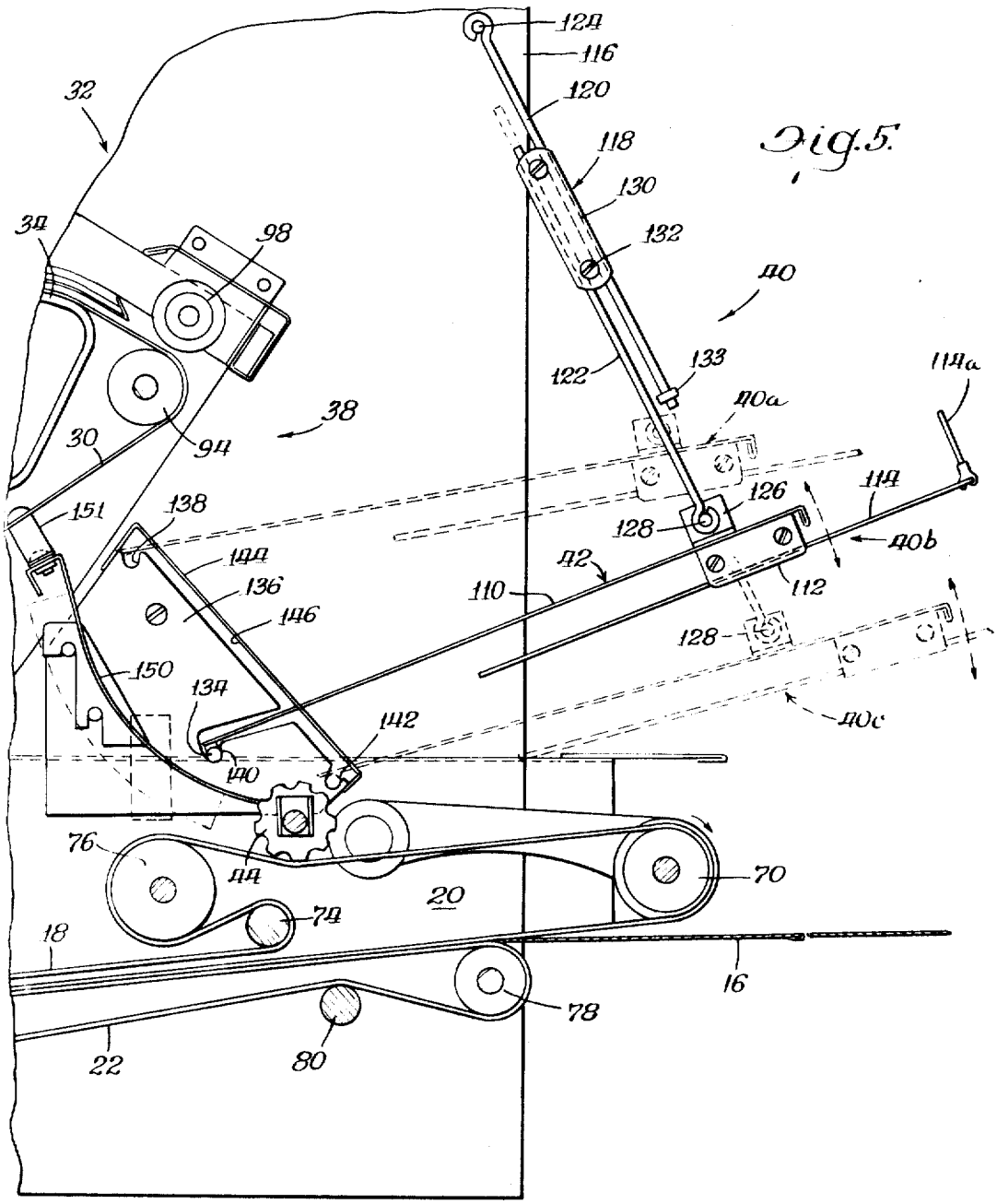
FIG. 5 is an enlarged side elevational view taken from the opposite side from FIG. 1 illustrating a tracing receiver assembly and its relation to the tracing separator assembly.

To condition the machine 10 for use with tracings 14 of a relatively long length which must be "rolled up" within the tray 42, the assembly 40 is adjusted to the position 40c or the lowermost position shown in dashed line in FIG. 5. In this position, the trunnions or pivot pins 134 are pivotally received within the slots 142, and the linkage 118 is adjusted to provide the degree of inclination of the tray 42 necessary to receive the rolled tracing 14. In this position, the drive wheel or feeding means 44, which is rotated in a clockwise direction in FIG. 1 and a counterclockwise direction in FIG. 5 by suitable drive means geared to the main drive means of the machine 10, is exposed. If the tracing 14 has face curl, the leading edge of the tracing 14 on discharge from the separator assembly 42 tends to drop downwardly into engagement with the continuously rotating drive means 44 either directly or following sliding movement along the rearmost portion of the table 110. Upon engagement with the drive means 44, the leading edge is moved to the left in FIG. 5 and up a somewhat arcuate or curved guide member 150. During the continuing ejection of the elongated tracing 14 from the separator assembly 32, the drive or feed means 44 tends to advance the tracing 14 into a roll and to continue rotation of the roll by engagement with the outer convolution thereof so that the tracing 14 is discharged in a loose roll mounted between the table 110 and the guide member 150. A plurality of spaced fingers 151 are secured to the upper end of the guide 150 and extend between the belts 30 to insure separation of the tracing 14 from these belts.

In the event that the nature of the tracing 14 is such that it cannot be placed in a loose roll or if the tracing is to be reinserted into the machine 10 to produce one or more additional copies, the assembly 40 preferably is adjusted to position 40b, and the lead edge of the tracing 14 is manually moved out of the tray 42 and over the front edge 114a on the wire grid 114. When the leading edge of the elongated tracing 14 is subsequently returned between the table 16 and the flexible belts 18 of the conveying assembly 20, the front edge 114a of the tray 42 provides a guiding surface.

Figure 6:
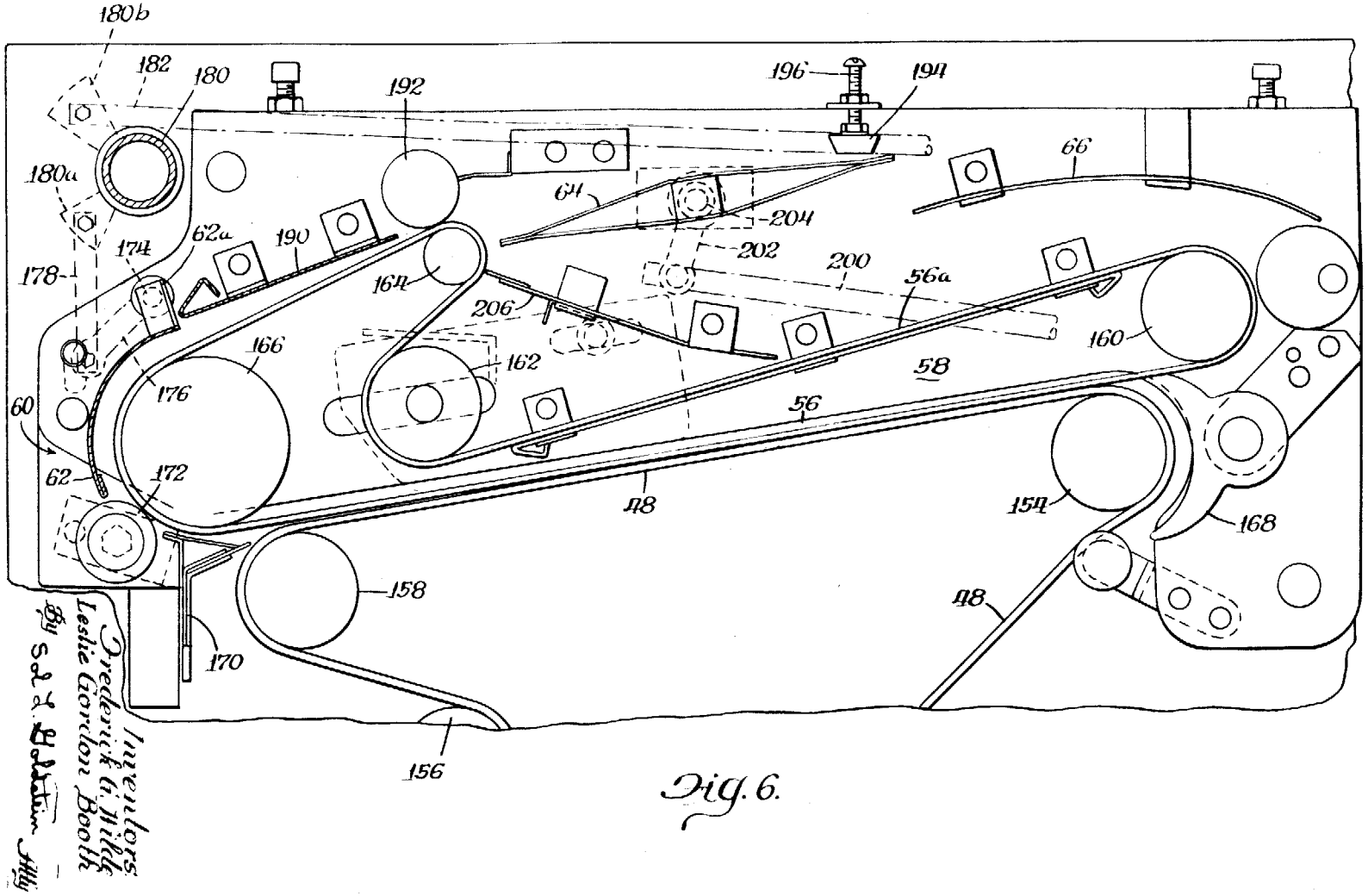
FIG. 6 is a side elevational view taken from an opposite side from FIG. 1 illustrating a copy conveying and discharging assembly included in the copying machine.

The conveying or sheet and web transporting assembly 50 (FIG. 1) includes a plurality of drive, idler and tensioning rollers 152, 154, 156, and 158 about which the plurality of flexible belts 48 pass to convey the exposed copy sheet 12 past the treating or developing chamber or tank 46 and into a position in which it is interposed between the belts 48 and the belts 56 in the conveying assembly 58. The conveying assembly 58 (FIGS. 1 and 6) includes a plurality of drive, idler, and tensioning pulleys 160, 162, 164, and 166 about which the flexible belts 56 pass. A generally arcuate guide 168 (FIG. 6) carried on the frame guides movement of the leading edge of the copy sheet or web 12 between the belts 48 and 56 so that the copy sheet travels to the left (FIG. 6) towards the discharge opening 60 at the rear or back of the housing for the machine 10. A guide structure 170 insures the separation of the leading edge of the sheet 12 from the flexible belts 48 and directs this leading edge between the portions of the belts 56 entrained on the pulley or roller 166 and an opposed roller 172 rotatably mounted on the housing.

If the machine 10 is producing copies of a relatively large size which are to be stacked or rolled by suitable means provided at the rear of the machine 10, the gate means 62 is operated to its open setting to permit the leading edge of the copy sheet 12 to leave the machine 10 through the opening 60. The gate means 62 comprises a generally arcuate member having a leg or projection 62a that is secured to a shaft 174 pivotally mounted on the frame of the housing. The shaft 174 is secured to an arm 176 (FIGS. 6 and 7) which is pivotally connected by a link 178 to an arm 180a of a bell crank 180 that is pivotally mounted on the housing of the machine. Another arm 180b of the bell crank is connected by a link 182 to an arm 184a of a bell crank 184 pivotally mounted on the housing. Another arm 184b of the bell crank 184 is pivotally connected by a link 186 to the upper end of a generally L-shaped control slide 188 that is slidably mounted on the housing for the machine 10.

When the slide 188 is moved to the left (FIG. 7), the bell crank 184 pivots in a clockwise direction to move the link 182 to the right. This pivots the bell crank 180 in a clockwise direction and is effective through the link 178 and the arm 176 to pivot the gate 62 in a clockwise direction (FIGS. 6 and 7) or a counterclockwise direction (FIG. 1) to the open position shown in solid line in FIG. 1. This permits the leading edge of the copy sheet 12 to be discharged through the opening 60 at the rear of the machine so that the ensuing portion of the copy sheet or web 12 is discharged through the opening 60. When the control element or slide 188 is moved to the right to the normal position shown in FIG. 7, the linkage described above causes the bell cranks 180 and 184 to pivot in a counterclockwise direction and to restore the gate means 62 to the normal or closed position shown in FIGS. 6 and 7 in which the rear discharge opening 60 is closed. In this condition, the leading edge of the copy sheet 12 is guided by the arcuate gate means 62 and an additional guide structure 190 (FIG. 6) so that the flexible belts 56 move the leading edge of the copy sheet 12 to a position in which it is interposed between the portions of the belts 56 entrained on the pulley 164 and an opposed roller 192 carried on the supporting structure.

The setting of the gate means 64 controls the path that the copy sheet or web 12 now takes in its movement toward the front discharge opening 64 (FIG. 1). If the gate means 64 remains in the position shown in FIG. 6, the belts 56 advance the sheet 12 so that it slides over the upper surface of the gate means 64 to a position interposed between the upper surface of the right end of the gate means and a sheet engaging member 194 secured in an adjusted position relative to the gate means 64 by a threaded faster 196. The leading edge of the copy sheet then drops into engagement with the curved guide member 66 and is driven over the guide member 66 in sliding engagement therewith by the flexible belts 56 to be received in the print tray 68 (FIG. 1). This setting of the gate means 64 is used with copy sheets 12 of sufficient length that they can be ejected through the opening 64 into the print tray 68 by the driving engagement provided by the portions of the belt 56 entrained on the pulley or roller 164.

If the machine 10 is to be conditioned for use with copies which are of a shorter length such that the trailing edge of the copy sheet 12 would pass beyond the pulley 164 and roller 192 before the leading edge is fully ejected, the gate means 64 is adjusted to its alternate position shown in dashed outline in FIG. 1 of the drawings. This control is exercised by a manually adjustable control element or slide 198 that is slidably mounted on the housing for the machine 10. An upstanding arm 198a on the generally L-shaped element 198 is pivotally connected to one end of a link 200, the other end of which is pivotally connected to an arm 202 secured to one end of a shaft 204. The shaft 204 is connected to the gate means 64. When the control member 198 is moved to the left (FIG. 7), the link 200 pivots the shaft 204 about its axis in a clockwise direction. This moves the gate means 64 to a position in which its left end is elevated to a position of substantially the same height as the roller 192, and in which its righthand edge drops to a position above the portions 56a of the conveying belts 56. With the gate means 64 in this position, the leading edge of the copy sheet impinges against the lower surface of the gate means 64 and is directed downwardly into sliding engagement with a guide surface 206 carried on the frame of the machine 10. The leading edge of the copy sheet 12 slides along the guide structure 206 until it engages the portions 56a of the conveying belts 56. These portions of the belts 56 transport the sheet 12 over the path shown in dashed outline in FIG. 1 so that it is received in the print tray 68. After the trailing edge of the copy sheet 12 passes beyond the pulley or roller 164, the forward portion thereof has been engaged by or rests on the portions 56a of the belts 56 to insure complete discharge or ejection of the copy sheet 12 from the machine 10 through the front opening 64.

The copying machine 10 includes a novel control circuit 210 (FIG. 8) for controlling the metered transmission of the treating agent or ammonia to the developing tank or chamber 46. A quantity of treating agent such as a concentrated ammonium hydroxide solution is provided in a receptacle 212 into which extends an inlet line 214 for an electrically controlled or operated pump which is indicated generally as 216 and which includes an electrical control or operating winding 218. The pump 216 is of any suitable construction of the many types well known in the art and includes an outlet line 220 connected to the inlet line 52 to the treating chamber 46. The construction of the pumping means 216 is such that each energization of the operating or control winding 218 transfers a fixed quantity of the liquid ammonium hydroxide from the supply receptacle 212 to the inlet line 52. By varying the number of operating signals applied to the winding 218 during each of a plurality of repetitive time cycles, the quantity of liquid ammonium hydroxide transferred to the developer tank 46 can be precisely controlled and metered.

To provide means for transmitting different selected numbers of operating signals to the winding means 218, the control circuit 210 includes an electric drive motor 222 that is continuously energized from a suitable source of power, such as a sixty cycle, one hundred and twenty volt line. During the interval in which the machine 10 is in operation, the motor 222 continuously drives three cams 224, 226, and 228 whose configuration is such as to cause the timed, sequential, and nonoverlapping closure of three switches or pairs of contacts 230, 232, and 234 during each cycle of rotation of the motor 222, which cycle of rotation determines the repetitive time cycle used by the control system or circuit 210. The drive motor 222 as well as the cams and switches controlled thereby can be of any suitable type but preferably comprises an "RD" cycle timer manufactured by the Haydon Division of General Time Corporation, Torrington, Connecticut.

A common terminal on the three pairs of contacts or switches 230, 232, and 234 is connected to one side of the input potential source, and the individual terminals on these three sets of contacts or switches are individually connected to three manually actuated switches 236, 238, and 240. One terminal of each of these three switches is connected to one side of the operating winding 218, and the other side of the operating winding is returned to the potential source. Thus, if only the switch 236 is closed, a single operating signal is supplied to the operating winding 218 during each cycle of rotation of the motor 222 in the interval in which the cam 228 closes the contacts 234. If both of the switches 236 and 238 are closed, the winding 218 receives two separate and time spaced operating signals during the time cycle defined by the cycle of rotation of the motor 222 during the intervals in which the cams 226 and 228 close the contacts 232 and 234. By also closing the switch 240, the operating winding 218 receives three operating signals during each of the time cycles under the control of the sequentially operated contacts 230, 232, and 234. Thus, following the selective closure of one or any group of the switches 236, 238, and 240, the pumping means 216 supplies a preselected and fixed quantity of anhydrous ammonia to the chamber 46 for so long as the drive motor 222 remains energized.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. In a copying apparatus using a fluid treating agent, drive means for establishing a copying time cycle, a treating chamber, a receptacle for containing a supply of the treating agent, pump means connected between the treating chamber and the receptacle, said pump means including electrical control means for operating the pump means to deliver a fixed increment of the fluid treating agent during each operation, means for producing a fixed number of electrical operating signals over a time cycle independent of said copying cycle, and control means operable to different settings to select different numbers of signals in each time cycle for application to the electrical control means to control the quantity of fluid treating agent delivered from the receptacle to the treating chamber.

2. In an apparatus for developing diazo material with ammonia gases, a treating chamber for applying ammonia gases to the diazo material, means for moving the diazo material relative to the treating chamber, a supply of liquid ammonia, drive means for establishing a copying time cycle, a pumping means connected between the supply and the treating chamber and having electrically controlled operating means for operating the pumping means to deliver a fixed quantity of ammonia to the treating chamber on each operation, an electrical potential source, a plurality of electrical switches, means for cyclically operating the switches over a time cycle independent of said copying cycle, and control means for connecting different numbers of the switches to the electrically controlled operating means to control the pumping means to deliver different quantities of ammonia to the treating chamber during each cyclic operation of the electrical switches.

3. The apparatus set forth in claim 2 in which the means for operating the switches includes cam means for actuating the switches, and motor means for continuously driving the cam means.

4. The apparatus set forth in claim 2 in which the control means includes a plurality of additional electrical switches, and circuit means connecting each of the additional electrical switches in series with one of the first mentioned electrical switches.

5. In an apparatus for developing diazo material with ammonia gases, a treating chamber for applying ammonia gases to the diazo material, means for moving the diazo material relative to the treating chamber, a supply of liquid ammonia, drive means for establishing a copying time cycle, a pumping means connected between the supply and the treating chamber and having electrically controlled operating means for operating the pumping means to deliver a fixed quantity of ammonia to the treating chamber on each opeartion, a controllable electrical signal source connected to the electrically controlled operating means for the pumping means, and control means for adjusting the signal source to apply different numbers of signals to the electrically controlled operating means over a time cycle independent of said copying cycle.

*6. In an apparatus for developing diazo material with ammonia gases, a treating chamber for applying ammonia gases to the diazo material, means for moving the diazo material relative to the treating chamber, a supply of liquid ammonia, drive means for establishing a copying time cycle, a pumping means connected between the supply and the treating chamber and having electrically controlled operating means for operating the pumping means to deliver a fixed quantity of ammonia to the treating chamber on each operation, a controllable electrical signal source connected to the electrically controlled operating means for energizing the electrically controlled operating means in each of a plurality of repetitive time cycles which are independent of the copying time cycle, and control means for adjusting the signal source to operate the pumping means through different numbers of operations in the repetitive time cycles to deliver different amounts of liquid ammonia to the treating chamber over the copying cycle.*

*7. In an apparatus for developing diazo material with ammonia gases, a treating chamber for applying ammonia gases to the diazo material, means for moving the diazo material relative to the treating chamber, a supply of liquid ammonia, drive means for establishing a copying time cycle, a pumping means connected between the supply and the treating chamber and having electrically controlled operating means for operating the pumping means to deliver a fixed quantity of ammonia to the treating chamber on each operating stroke, a controllable electrical sginal source connected to the electrically controlled operating means for the pumping means, said signal source energizing the electrically controlled operating means to operate the pumping means through a given number of operating strokes in each of a number of repetitive time cycles that are independent of the copying time cycle, and control means for adjusting the signal source to change the electrical signal supplied to the electrically controlled operating means during each repetitive time cycle to cause the pumping means to operate through different numbers of strokes and deliver different amounts of liquid ammonia to the treating chamber during each of the repetitive time cycles.*

*8. The apparatus set forth in claim 7 in which the controllabe signal source includes a continuously operating electric motor, cam means coupled to and actuated by the motor, electric switch means periodically actuated between open and closed conditions by the cam means, a potential source, and circuit means connecting the electric switch means between the potential source and the electrically controlled operating means.*

*9. In an apparatus for developing diazo material with ammonia gases, a treating chamber for applying ammonia gases to the diazo material, means for moving the diazo material relative to the treating chamber, a supply of liquid ammonia, drive means for establishing a copying time cycle, pumping means connected between the supply and the treating chamber and having electrical control means for operating the pump to deliver a fixed quantity of ammonia to the treating chamber during each operation, a controllable electrical signal source connected to said control means for operating said pump, and control means for adjusting the signal source to operate said pump different selected numbers of times over a time cycle that is independent of said copying time cycle.*

References Cited

The following references, cited by the Examiner, are of record in the patented file of this patent or the original patent.

UNITED STATES PATENTS

| | | | |
|---|---|---|---|
| 2,475,809 | 7/1949 | Sullivan et al. | 95—94 X |
| 2,836,110 | 5/1958 | Frantz | 95—89 |
| 2,926,592 | 3/1960 | Wilde | 95—95 X |
| 3,088,391 | 5/1963 | Sigler | 95—89 X |
| 3,147,687 | 9/1964 | Halden | 95—89 X |
| 3,174,420 | 3/1965 | Aizawa | 95—89 X |

NORTON ANSHER, *Primary Examiner.*

F. L. BRAUN, *Assistant Examiner.*

U.S. Cl. X.R.

95—89